United States Patent
Fulton et al.

(10) Patent No.: US 10,431,986 B2
(45) Date of Patent: Oct. 1, 2019

(54) DISTRIBUTED GENERATOR AUTOMATIC PROVISIONING

(71) Applicant: INFINITE INVENTION INC., Falls Church, VA (US)

(72) Inventors: Whitman Fulton, Falls Church, VA (US); Adam Koeppel, Washington, DC (US)

(73) Assignee: INFINITE INVENTION INC., Falls Church, VA (US)

(*) Notice: Subject to any disclaimer, the term of this patent is extended or adjusted under 35 U.S.C. 154(b) by 116 days.

(21) Appl. No.: 14/940,765

(22) Filed: Nov. 13, 2015

(65) Prior Publication Data

US 2017/0141575 A1    May 18, 2017

(51) Int. Cl.
*H02J 3/38* (2006.01)
*G05B 15/02* (2006.01)
*H02J 13/00* (2006.01)

(52) U.S. Cl.
CPC .......... *H02J 3/381* (2013.01); *H02J 13/0006* (2013.01); *H02J 13/0062* (2013.01); *H02J 13/0075* (2013.01); *H02J 13/0079* (2013.01); *Y02E 40/72* (2013.01); *Y02E 60/7838* (2013.01); *Y02E 60/7853* (2013.01); *Y04S 10/12* (2013.01); *Y04S 40/124* (2013.01); *Y04S 40/126* (2013.01)

(58) Field of Classification Search
CPC .... H02J 3/381; H02J 13/0006; H02J 13/0075; H02J 13/0079; H02J 13/0062; G05B 15/02; Y02E 60/7853; Y02E 40/72; Y02E 60/7838; Y04S 40/126; Y04S 10/12; Y04S 40/124
See application file for complete search history.

(56) References Cited

U.S. PATENT DOCUMENTS

| | | | |
|---|---|---|---|
| 7,274,305 B1* | 9/2007 | Luttrell | B61L 1/20 324/141 |
| 8,140,414 B2* | 3/2012 | O'Neil | G01D 4/004 340/870.02 |
| 8,204,633 B2* | 6/2012 | Harbin, III | F24D 19/1051 219/483 |
| 8,768,526 B2* | 7/2014 | Harbin, III | F24D 19/1051 219/483 |
| 9,152,160 B2* | 10/2015 | Harbin, III | F24D 19/1051 |
| 9,318,861 B2* | 4/2016 | Fulton | H01R 33/945 |
| 9,437,986 B2* | 9/2016 | Knauer | H01R 13/53 |
| 2005/0008904 A1* | 1/2005 | Suppes | B60L 11/1881 429/9 |
| 2010/0004790 A1* | 1/2010 | Harbin, III | F24D 19/1051 700/291 |
| 2010/0141205 A1* | 6/2010 | Tyler | B60L 11/1816 320/109 |

(Continued)

*Primary Examiner* — Charles R Kasenge
(74) *Attorney, Agent, or Firm* — Hamre, Schumann, Mueller & Larson, P.C.

(57) ABSTRACT

A monitoring system includes a centralized generation and control system of an electrical grid operator. A distributed generator integration device connects a distributed generator to the electrical grid, and automatically initiates machine-to-machine communications with the distributed generator to: gather specification and performance data, control the distributed generator, and automatically add and configure the distributed generator to the centralized generation control of the monitoring system.

11 Claims, 3 Drawing Sheets

(56) References Cited

U.S. PATENT DOCUMENTS

| | | | |
|---|---|---|---|
| 2011/0057612 A1* | 3/2011 | Taguchi | B60L 11/1824 |
| | | | 320/109 |
| 2013/0106397 A1* | 5/2013 | Fulton | G01R 11/04 |
| | | | 324/76.11 |
| 2013/0146586 A1* | 6/2013 | Harbin, III | F24D 19/1051 |
| | | | 219/494 |
| 2014/0218010 A1* | 8/2014 | Fulton | H01R 33/90 |
| | | | 324/110 |
| 2016/0020561 A1* | 1/2016 | Knauer | H01R 13/53 |
| | | | 439/535 |
| 2016/0036234 A1* | 2/2016 | Del Olmo | H02J 3/383 |
| | | | 307/52 |
| 2016/0036372 A1* | 2/2016 | Hoepfner | H02J 3/383 |
| | | | 700/287 |
| 2016/0036373 A1* | 2/2016 | Hoepfner | H02J 3/383 |
| | | | 700/287 |

\* cited by examiner

DISTRIBUTED GENERATOR AUTOMATIC PROVISIONING

FIELD

The embodiments described herein pertain, generally, to centralized control of a distributed generation device.

SUMMARY

In accordance with at least one embodiment, a method implemented by a distributed generator integration device that connects a distributed generator to the electrical grid, includes initiating communications between the distributed generator integration device and the distributed generator, retrieving data from the distributed generator to provide the distributed generator integration device with specification and performance data, assuming control of the distributed generator, adding and configuring the distributed generator to a centralized operator distributed generation control and monitoring system, and transmitting, to a distributed generation management system, the distributed generator specification and performance data.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1:
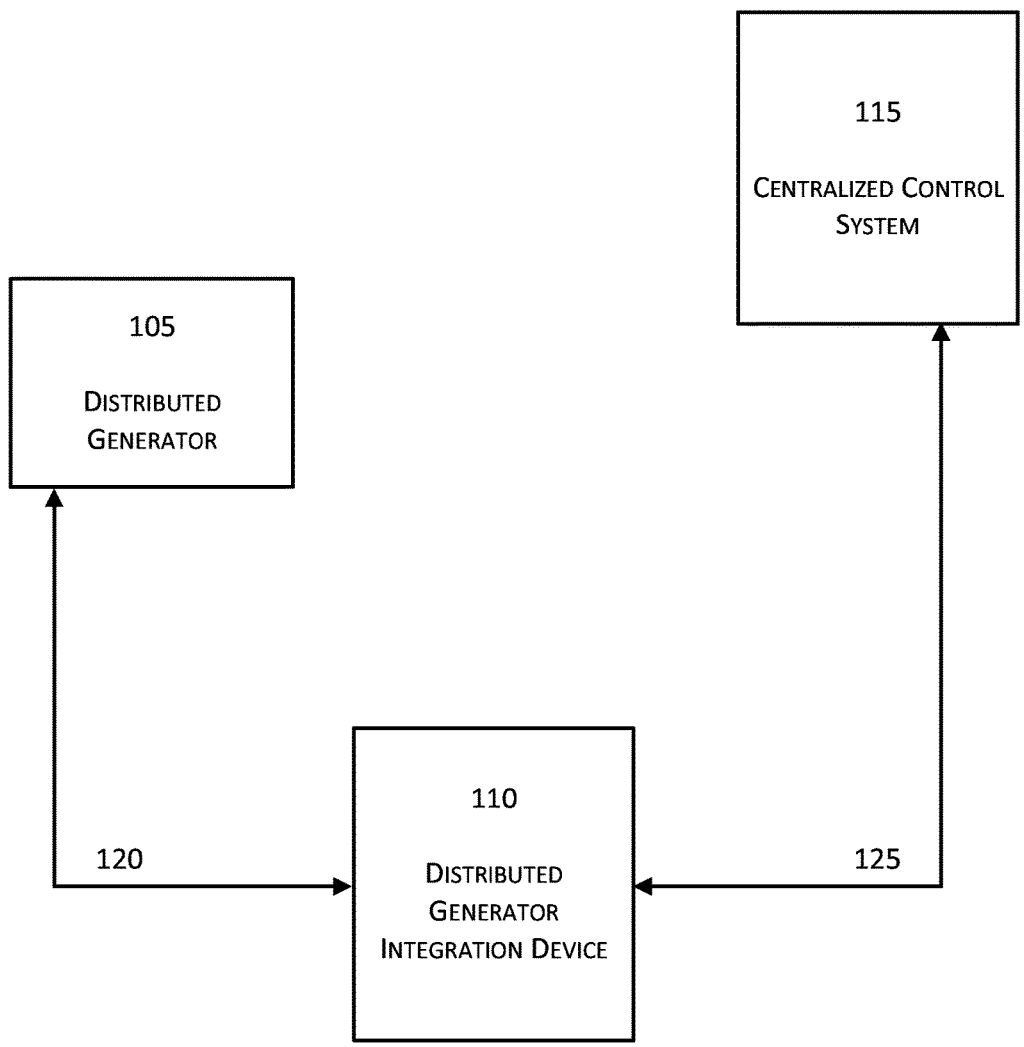
FIG. 1 is a block diagram depicting the distributed generator control system, in accordance with examples described herein.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

The example embodiments described herein pertain to methods, programs, applications, systems, and apparatuses for distributed generator automatic provisioning.

According to the embodiments described herein, when installing a distributed generation device that will be centrally controlled by a utility or other electrical grid operator, an operator is no longer required to configure the distributed generator to communicate with the operator's generation control system.

Thus, no longer must a technician manually enter configuration parameters into the distributed generation device to enable communications between the device and the operator's control systems. Accordingly, scalability of installation is no longer hindered.

Further, in accordance with the embodiments described herein, an automatically configured distributed generator is provisioned to communicate with a separately owned and managed grid operator generation and control system; and, therefore, the automatically configured distributed generator may automatically communicate with the generation control system of an electrical grid operator.

FIG. 1 is a block diagram depicting the distributed generator control system, in accordance with examples described herein. As depicted, system 100 includes, at least, distributed generator 105, distributed generator integration device 110, and centralized control system 115.

Distributed generator 105 may be connected, via a power connection and/or a data connection, to a distributed generator integration device 110. Distributed generator 105 may refer to typically small, i.e., less than 1MW, power generators that are connected directly to local electric distribution grids. Examples of a distributed generator may include solar cell arrays, battery or fuel-cell storage systems, electric vehicles, combustion or hydro micro-turbines, and small wind turbines.

Distributed generator integration device 110, which may be implemented as a meter collar or an attachment to a meter collar, is provided to, in part, connect the distributed generator 105 to electrical grid 115. Distributed generator integration device may refer to a device including a meter collar or junction box that allows for connection of a distributed generator to an electrical grid, and control and monitoring of the associated distributed generator. Examples of distributed generator integration devices include meter collars, junction boxes, or discrete housings, each of which include power and data interfaces to the distributed generator and the electrical grid.

Data connection 120, connecting distributed generator 105 and distributed generator integration device 110, may refer to any one of: an electrical connection, via power line communications; machine-to-machine communications, via Ethernet, serial, Modbus, or other known machine-to-machine communications protocols; radio frequency communications, via ZigBee WiFi, or other known wireless communication protocols; or other data carrying connections between distributed generator 105 and distributed generator integration device 110.

Data connection 125, connecting distributed generator integration device 110 and centralized control system 115 may be implemented by an electrical power connection.

Centralized control system 115 may refer to a computer system and associated human interfaces utilized by a grid operator to manage, measure, and control all power generation systems operated by the grid operator. Examples include a SCADA system used by a utility, an internet based load curtailment system utilized by an energy demand response operator, a distributed energy resource management system used by a grid operator, or a cloud-based program exposing data interfaces to any of the systems above.

Figure 2:
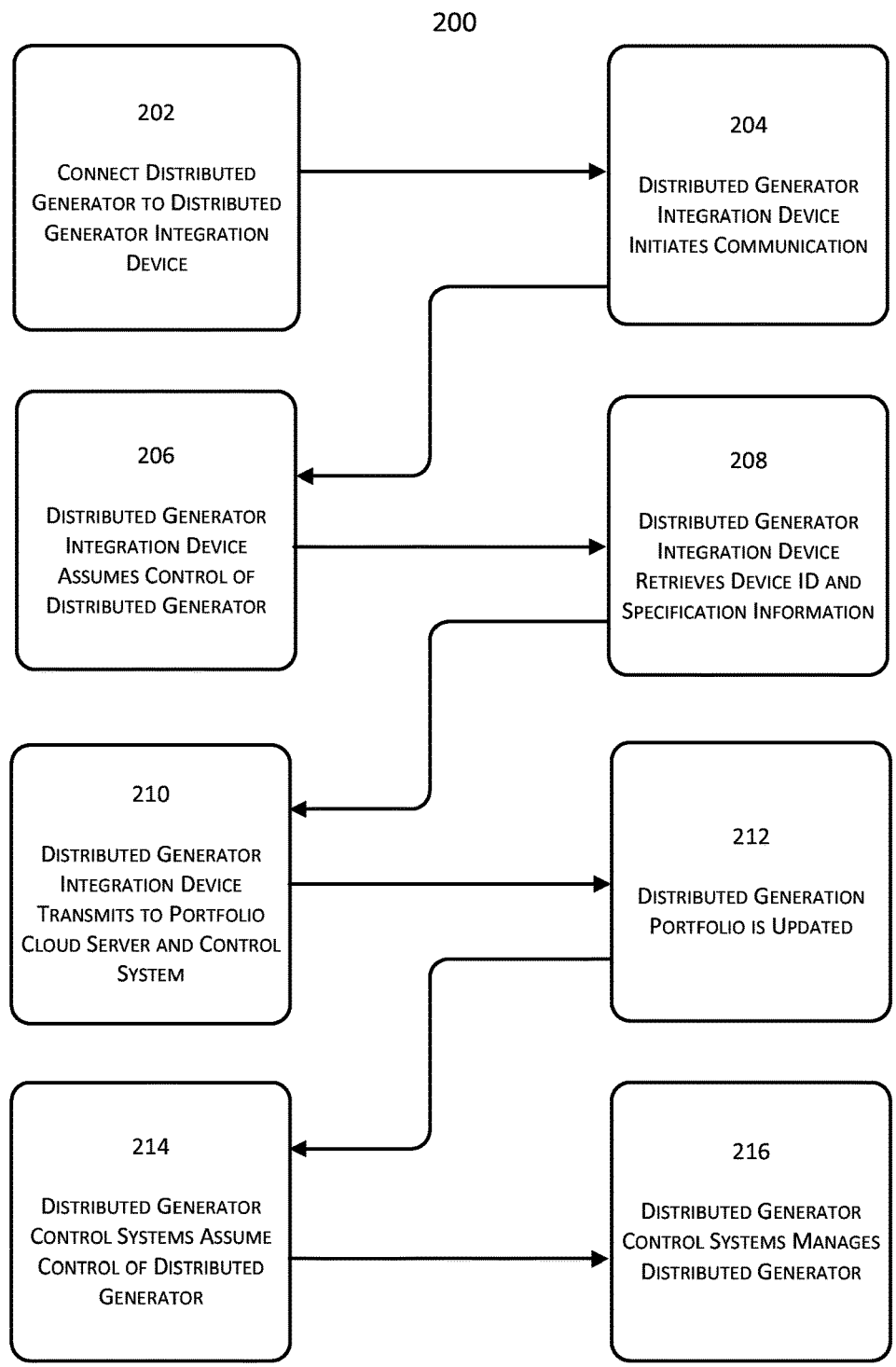
FIG. 2 shows a flowchart that depicts an example process for integrating a distributed generator into a centralized operator distributed generation portfolio, in accordance with examples described herein.

FIG. 2 shows a flowchart that depicts an example process for integrating a distributed generator into a centralized operator distributed generation portfolio, in accordance with examples described herein.

Process 200 may be implemented by any of the embodiments and/or components thereof referenced previously in FIG. 1. According to the description of the operations in FIG. 2, any of the operations depicted and described herein may be implemented, at least in part, as computer-readable instructions stored on a computer-readable medium stored on and/or executed on any one or more of distributed generator integration device 110 and centralized control system 115. Example process 200 may include one or more operations, actions, or functions as illustrated by one or more blocks 202, 204, 206, 208, 210, 212, 214, and 216 Although illustrated as discrete blocks, various blocks may be divided into additional blocks, combined into fewer blocks, or eliminated, depending on the desired implementation. Processing may begin at 202.

Block 202 (Connect Distributed Generator to Distributed Generator Integration Device) may refer to distributed generator integration device 110 being physically connected or coupled to distributed generator 105. As set forth above, distributed generator integration device 110 may be implemented as a meter collar that physically couples to distributed generator 105. Alternatively, distributed generator integration device 110 may be implemented as an attachment to such meter collar.

Block 204 (Distributed Generator Integration Device Initiates Communication) may refer to distributed generator integration device 110 initiating data communication with distributed generator 105, via data connection 120.

Block 206 (Distributed Generator Integration Device Assumes Control of Distributed Generator) may refer to distributed generator integration device 110 assuming operational control of distributed generator 105, again via data connection 120.

Block 208 (Distributed Generator Integration Device Retrieves Device ID and Specification Information) may refer to distributed generator integration device 110 retrieving or otherwise gathering device identification data and operational specification data from distributed generator 105, via data connection 120.

Block 210 (Distributed Generator Integration Device Transmits to Portfolio Cloud Server and Control System) may refer to distributed generator integration device 110 transmitting its own device identification data, as well as the gathered device identification data and operational specification data corresponding to distributed generator 105, to a distributed generation portfolio cloud server and control system 115.

Block 212 (Distributed Generation Portfolio is Updated) may refer to distributed generator 105 and distributed generator integration device 110 being added as a collective asset in a distributed generation portfolio, as well as a managed device, in a distributed generator control system, i.e., centralized control system 115.

Block 214 (Distributed Generator Control Systems Assume Control of Distributed Generator) may refer to distributed generator control system, i.e., centralized control system 115, assuming operational control, e.g., acquisition and provisioning, of distributed generator 105, via distributed generator integration device 110.

Block 216 (Distributed Generator Control Systems Manages Distributed Generator) may refer to distributed generator control system, i.e., centralized control system 115, managing routine operational processes associated with distributed generator 105, via distributed generator integration device 110.

Accordingly, by the operations in FIG. 2, when installing distributed generation device 110, which is centrally controlled by a utility or other electrical grid operator, an operator is no longer required to configure the distributed generator to communicate with the operator's generation control system.

Figure 3:
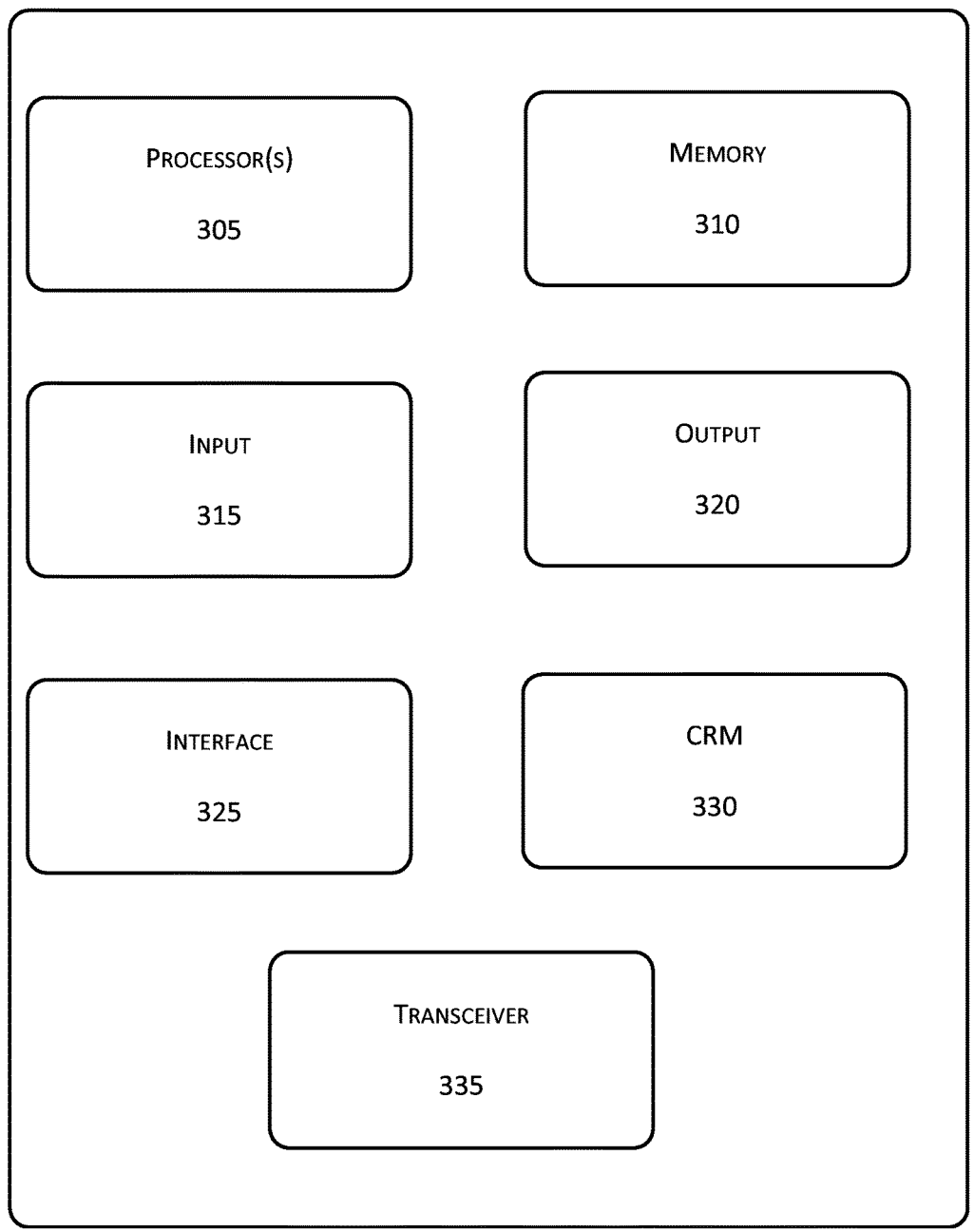
FIG. 3 shows an example computing device on which and by which at least portions of distributed generator automatic provisioning may be implemented, arranged in accordance with one or more embodiments described herein.

FIG. 3 shows an example computing device on which and by which at least portions of distributed generator automatic provisioning may be implemented, arranged in accordance with one or more embodiments described herein.

FIG. 3 shows an illustrative computing embodiment, in which any of the processes and sub-processes of distributed generator automatic provisioning may be implemented as computer-readable instructions stored on a computer-readable medium. The computer-readable instructions may, for example, be executed by a processor either or both of distributed generator integration device 110 and/or centralized control system 115, as referenced herein, having a network element and/or any other device corresponding thereto, particularly as applicable to the applications and/or programs described above corresponding to the configuration 100.

In a very basic configuration, a computing device 300 may typically include, at least, one or more processors 305 and a system memory 310. Computing device 300 may also include one or more input components 315, one or more output components 320, a display component 325, a computer-readable medium 330, and a transceiver 335.

Processor(s) 305 may refer to, e.g., a microprocessor, a microcontroller, a digital signal processor, or any combination thereof.

Memory 310 may refer to, e.g., a volatile memory, non-volatile memory, or any combination thereof. Memory 310 may store, therein, an operating system, an application, and/or program data. That is, memory 310 may store executable instructions to implement any of the functions or operations described above and, therefore, memory 310 may be regarded as a computer-readable medium.

Input component 315 may refer to a built-in telecommunication device. Further, an input component, if not built-in to computing device 300, may be communicatively coupled thereto via short-range communication protocols including, but not limited to, radio frequency, or Bluetooth, as set forth above.

Output component 320 may refer to a component or module, which may be built-in or removable from computing device 300, which is configured to output data to an external device.

Display component 325 may refer to, e.g., a solid state display that may have touch input capabilities. That is, a display component may include capabilities that may be shared with or replace those of the aforementioned input components.

Computer-readable medium 330 may refer to a separable machine readable medium that is configured to store one or more programs that embody any of the functions or operations described above. That is, a computer-readable medium, which may be received into or otherwise connected to a drive component of computing device 300, may store executable instructions to implement any of the functions or operations described above. These instructions may be complimentary or otherwise independent of those stored by memory 310.

Transceiver 335 may refer to a network communication link for computing device 300, configured as a wired network or direct-wired connection. Alternatively, a transceiver may be configured as a wireless connection, e.g., radio frequency (RF), infrared, Bluetooth, and other wireless protocols.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. A method implemented by a distributed generator integration device that connects a distributed generator to the electrical grid, the method comprising:
 initiating machine-to-machine communications between the distributed generator integration device and the distributed generator, having at least a data connection therebetween,
  wherein the distributed generator integration device is a meter collar that connects directly to the power output of the distributed generator, and
  wherein power generated by the distributed generator is less than 1 MW;
 automatically retrieving data from the connected distributed generator to provide the distributed generator integration device with specification and performance data;
 establishing control of the connected distributed generator by the distributed generator integration device based on the retrieved data;
 adding and configuring the distributed generator integration device and the connected distributed generator to be controlled and monitored by a centralized operator distributed generation control and monitoring system; and
 relaying control signals from the centralized operator distributed generation control and monitoring system to the connected distributed generator; and
 relaying monitoring data from the electrically connected distributed generator to the centralized operator distributed generation control and monitoring system.

2. The method implemented by the distributed generator integration device of claim 1, wherein the machine-to-machine communication between the distributed generator integration device and the connected distributed generator is initiated and conducted over the data connection, which is a wired connection.

3. The method implemented by the distributed generator integration device of claim 1, wherein the machine-to-machine communication between the distributed generator integration device and the connected distributed generator is initiated and conducted over data connection, which is a wireless connection.

4. The method implemented by the distributed generator integration device of claim 1, wherein the machine-to-machine communication between the distributed generator integration device and the connected distributed generator is initiated and conducted over a power line connection.

5. A method implemented by a distributed generator integration device that connects a distributed generator to the electrical grid, the method comprising:
 detecting at least a data connection between a distributed generator and the distributed generator integration device,
  wherein the distributed generator integration device is a meter collar that connects directly to the power output of the distributed generator, and
  wherein power generated by the distributed generator is less than 1 MW;
 determine how to directly connect the distributed generator integration device to the distributed generator by selecting an available communication portion corresponding to the distributed generator integration device, including one of wired communications ports, powerline carrier communications ports, and wireless communications ports;
 initiating communications by directly connecting to the distributed generator via the selected communication port;
 retrieving data from the directly connected distributed generator to provide the distributed generator integration device with specification and performance data;
 transmitting the retrieved data to a centralized operator distributed generation control and monitoring system;
 relaying control signals and monitoring data between the centralized operator distributed generation control and monitoring system and the directly connected distributed generator.

6. The method of claim 5, wherein the meter collar is an electrical meter.

7. The method claim 5, wherein the selected communication port corresponding to the distributed generator integration device provides direct wired communications to the meter collar.

8. The method of claim 5, wherein the selected communication port corresponding to the distributed generator integration device provides direct powerline communications to the meter collar.

9. The method of claim 5, wherein the selected communication port corresponding to the distributed generator integration device is a wireless communication port that provides direct wired communications to the meter collar.

10. The method of claim 7, wherein the data connection between the distributed generator and meter collar is a wireless connection.

11. The method of claim 7, wherein the data connection between the distributed generator and meter collar is a wired connection.

* * * * *